(12) United States Patent
Celo

(10) Patent No.: US 9,383,516 B2
(45) Date of Patent: Jul. 5, 2016

(54) SYSTEM AND METHOD FOR OPTICAL INPUT/OUTPUT ARRAYS

(71) Applicant: Huawei Technologies Co., Ltd., Shenzhen (CN)

(72) Inventor: Dritan Celo, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/475,145

(22) Filed: Sep. 2, 2014

(65) Prior Publication Data

US 2016/0062043 A1 Mar. 3, 2016

(51) Int. Cl.
*G02B 6/34* (2006.01)

(52) U.S. Cl.
CPC .................................... *G02B 6/34* (2013.01)

(58) Field of Classification Search
CPC .......... G02B 2006/12107; G02B 6/30; G02B 2006/12061; G02B 5/1809; G02B 60/0006
USPC ................................. 385/37, 39, 14
See application file for complete search history.

(56) References Cited

U.S. PATENT DOCUMENTS

| | | | | |
|---|---|---|---|---|
| 2002/0067882 A1* | 6/2002 | Guilfoyle | ................. | G02B 6/43 385/24 |
| 2005/0194990 A1* | 9/2005 | Gothoskar | ............... | G02B 6/30 324/754.23 |
| 2008/0138088 A1* | 6/2008 | Welch | ..................... | H01S 5/026 398/183 |
| 2011/0150386 A1 | 6/2011 | Dupuis et al. | | |
| 2013/0005606 A1* | 1/2013 | Chakravarty | ........ | G01N 21/253 506/9 |
| 2013/0308898 A1 | 11/2013 | Doerr et al. | | |

FOREIGN PATENT DOCUMENTS

| CN | 2901397 Y | 5/2007 |
|---|---|---|
| CN | 102656494 A | 9/2012 |

* cited by examiner

*Primary Examiner* — Ellen Kim
(74) *Attorney, Agent, or Firm* — Slater Matsil, LLP

(57) ABSTRACT

System and method embodiments are provided for high density on-chip optical input/output (I/O) arrays with partition waveguide routing topology. System and apparatus embodiments for on-chip optical I/O arrays provide for doubling the density of optical I/O arrays in a given footprint on a photonic integrated circuit (PIC) chip. System and apparatus embodiments for on-chip optical I/O arrays also provide waveguide routing topology to provide signal feedback to facility automated active alignment and coupling of optical fiber arrays in to surface grating coupler elements without use of waveguide crossings and without intersecting with waveguides connecting devices to I/O ports. In an embodiment, a PIC chip includes a plurality of first optical I/O elements and a plurality of second optical I/O elements, wherein a row of I/O elements comprises alternating ones of the first optical I/O elements and the second optical I/O elements.

21 Claims, 4 Drawing Sheets

SYSTEM AND METHOD FOR OPTICAL INPUT/OUTPUT ARRAYS

TECHNICAL FIELD

The present invention relates to an integrated photonics system, and, in particular embodiments, to systems and apparatuses for high efficient routing of waveguides in optical systems with large number and high density of optical input/output (I/O)s.

BACKGROUND

Photonic integrated circuit (PIC) technology is expected to play an increasingly important role in optical communications, imaging, computing, and sensing with the promise for significant reduction in cost and weight of these systems. Future advancement of this technology is significantly dependent on the ability to develop better scalability, testability, high performance, and cost effectiveness for this technology.

On-chip surface grating coupler (GC) optical I/O interface components are key to every PIC interconnect. The latest developments have resulted in compact GC that efficiently couples light to and from a standard fiber optic. By arranging fibers and optical I/Os in an array configuration and introducing an optical feedback loop, the optical alignment process can become more efficient, but at a cost. Both fiber array and GC optical I/Os should have the same accepted standard pitch of 127 microns (µm), which limits PIC chip density and increases the overall cost. In addition, the existing optical feedback loop configuration does not allow flexible optical interconnects. The problem becomes more severe when a large number of optical I/Os per chip are required since the optical I/O footprint may become prohibitively expensive. In addition, it could prevent wafer-scale automated testing and verification.

SUMMARY

In accordance with an embodiment, a PIC chip includes a plurality of first optical I/O elements and a plurality of second optical I/O elements, wherein a row of I/O elements comprises alternating ones of the first optical I/O elements and the second optical I/O elements, and wherein the PIC chip is configured such that first optical elements couple to the first optical I/O elements from a first side of the PIC chip and second optical elements couple to the second optical I/O elements from a second side of the PIC chip.

In accordance with an embodiment, a network component configured for transmitting and receiving optical signals includes an input interface; an output interface; and at least one of a controller and a switching element, wherein at least one of the input interface, the output interface, and the at least one of a controller and a switching element comprises a PIC chip, wherein the PIC chip includes a plurality of first optical I/O elements; and a plurality of second optical I/O elements, wherein a row of I/O elements comprises alternating ones of the first optical I/O elements and the second optical I/O elements, and wherein the PIC chip is configured such that first optical elements couple to the first optical I/O elements from a first side of the PIC chip and second optical elements couple to the second optical I/O elements from a second side of the PIC chip.

In accordance with an embodiment, a photonic chip includes a first array of on-chip optical I/O elements; and a second array of on-chip optical I/O elements, wherein the first array and second array are interlocking such that an I/O element in the first array is separated from another I/O element in the first array by an I/O element in the second array and such that an I/O element in the second array is separated from another I/O element in the second array by an I/O element in the first array.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
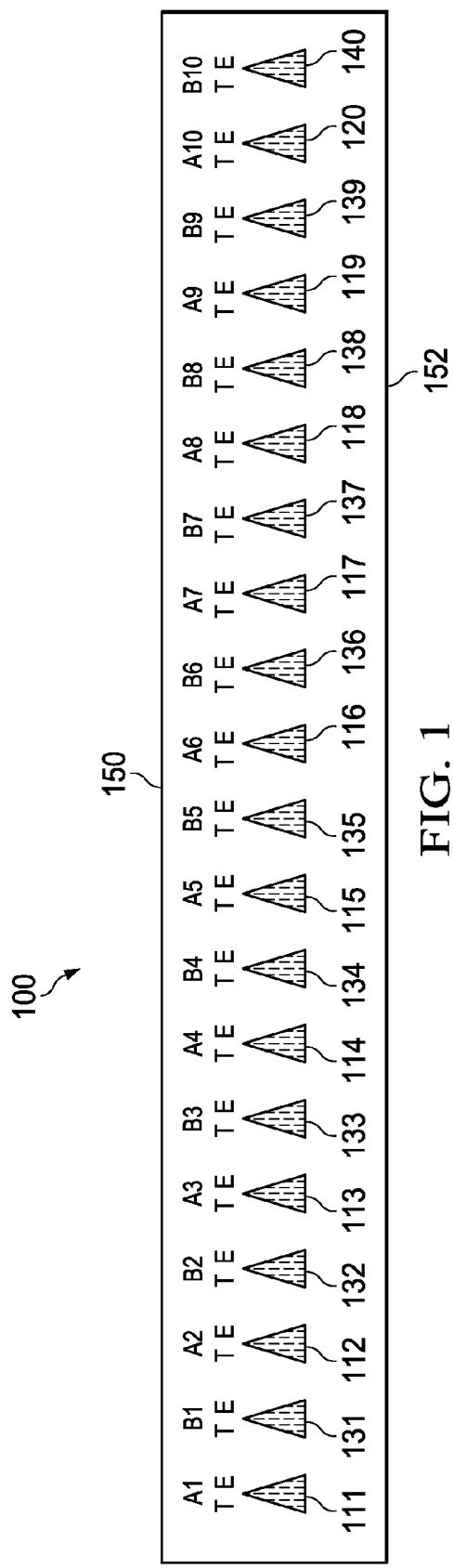
FIG. 1 is a schematic diagram of an embodiment PIC chip with optical I/O arrays.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Existing solutions for optical I/O arrays offer limited density. The density between neighboring GC elements in the array is fixed at 127 µm and dictated by fiber optic array pitch. Reducing fiber optic array pitch below 127 µm is very costly. It becomes even more problematic when polarization maintaining fibers in the array are required.

Additionally, existing solutions of optical feedback loops allows connectivity from one side of the array only (either top or bottom). Using the existing technique in a double density array, as described herein, requires addition of several waveguide crossing components, thereby introducing additional optical losses.

Disclosed herein are systems and apparatuses for high density of on-chip optical I/Os. In an embodiment, a higher density of on-chip optical I/Os is achieved by doubling the number of surface GC elements in an array footprint. By staggering two I/O arrays (array "A" and array "B"), the distance between neighboring GC elements is reduced to 68.5 µm while preserving the standard pitch of 127 µm in each array. As a result, a very slight increase (approximately 5%) in the overall footprint allows twice as many optical I/Os. By offsetting the fiber array probe, optical coupling to the newly proposed optical I/O array can be achieved with the same standard fiber array. In one embodiment, the overall optical I/O footprint using the disclosed high density on-chip optical I/Os is reduced by 34% as compared to prior art systems.

In an embodiment, a waveguide routing topology is disclosed to provide an optical feedback alignment loop to facilitate fiber array alignment for both arrays "A" and "B". In addition, this topology partitions arrays in such a way that allows connectivity to and from the GC elements from the top and bottom, without requiring any waveguide crossing. As a result, design layout can be simplified and the number of connected optical component/devices can be increased substantially.

In an embodiment, a higher density on-chip optical I/O is disclosed. Additionally, a partitioning waveguide routing topology is disclosed that allows full access to and from all apical I/Os without any additional waveguide crossing element. Introducing higher density arrays of GC optical I/Os and waveguide routing topology increases optical interconnect flexibility.

Optical I/Os with surface GC elements are vital components of every Silicon photonic (SiP) chip. However, in order to keep up with the rapid increase in SiP chip density, optical I/O designers face a twofold challenge—to increase I/O density while reducing the overall I/O footprint. Such challenging tasks are addressed by the systems and apparatuses of this disclosure.

The disclosed higher density arrangement of GC elements and the disclosed topology are a perfect match for automated optical testing of on-chip devices and components. Automated testing of SiP chips has become a reality. Increasing the number of optical I/O per array results in more compact I/O areas and, in turn, shortens the traveling course of fiber optical array probe. In addition, the disclosed systems and apparatuses allow more devices to be tested simultaneously by tremendously improving testing efficiency.

Wafer-scale automated testing for large scale production of SiP chips will also benefit from the disclosed systems and apparatuses. Similar to electronic ASIC circuits, foundries processing SiP chips need wafer-scale testing. High density optical I/O arrays with an optical feedback loop allow the development of such processes.

FIG. 1 is a schematic diagram of an embodiment photonic integrated circuit (PIC) chip 100 with optical I/O arrays. PIC 100 has a first side 150 and a second side 152 and includes a plurality of optical I/O elements 111-120, 131-140. The first side 150 and the second side 152 may also be referred to as the top and bottom of the PIC 100. The I/O elements are grouped into two arrays—A and B. Array A includes optical I/O elements 111-120 labeled as A1-A10. Array B includes optical I/O elements 131-140 labeled as B1-B10. The arrays A and B are arranged in an interleaving fashion such that an optical I/O element in array A (e.g., optical I/O element A6 116) is separated from another optical I/O element in array A (e.g., optical I/O element A7 117) by an optical I/O element in array B (e.g., optical I/O element B6 136). Similarly, an optical I/O element in array B (e.g., optical I/O element B3 133) is separated from another optical I/O element in array B (e.g., optical I/O element B4 134) by an optical I/O element in array A (e.g., optical I/O element A4 114). In an embodiment, optical I/O elements 111-120 in array A are optically coupled to optical elements from the first side 150 and optical I/O elements 131-140 are optically coupled to optical elements from the second side 152.

In an embodiment, the optical I/O elements 111-120 and 131-140 are surface grating couplers (SGCs). The distance between successive optical I/O elements 111-120 in array A or between successive optical I/O elements 131-140 in array B is determined by the fiber optical array pitch. In an embodiment, the fiber optical array pitch is 127 μm. However, the distance between neighboring I/O elements 111-120 and 131-140 is half the distance between successive optical I/O elements 111-120 in array A or optical I/O elements 131-140 in array B. By staggering two I/O arrays (array A and array B) and by coupling optical elements that couple to optical I/O elements 111-120 in array A from the first side and coupling optical elements that couple to optical I/O elements 131-140 in array B from the second side 152, the density of optical I/O elements may be approximately doubled while maintaining the standard array pitch.

Various optical I/O elements are well known in the art as are methods of fabricating I/O elements. The optical I/O elements 111-120, 131-140 may be fabricated from any number of materials including, for example, one or more of silicon, lithium niobate (LiNbO$_3$), silica on silicon, silicon on insulator, various polymers, and semiconducting materials such as gallium arsenide (GaAs) and indium phosphide (InP).

Although a single row of optical I/O elements 111-120, 131-140 is illustrated, a PIC chip may include multiple rows of optical I/O arrays.

Figure 2:
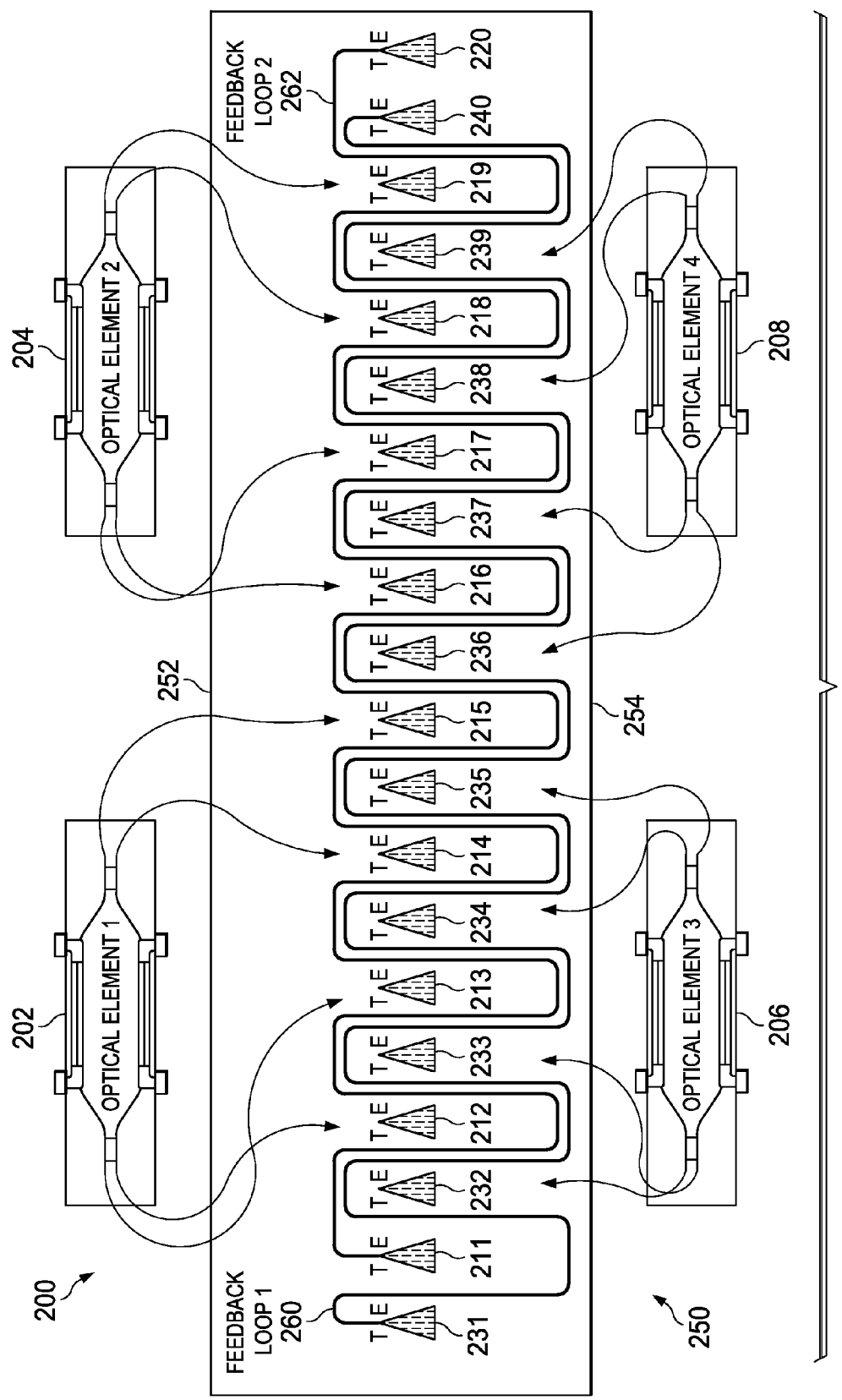
FIG. 2 is a schematic diagram of an embodiment PIC with optical arrays and feedback loop waveguides.

FIG. 2 is a schematic diagram of an embodiment PIC 200 with optical arrays and feedback loop waveguides. PIC 200 includes an optical I/O arrays component 250 having a first side 252 and a second side 254. Optical I/O arrays component 250 includes two staggered optical I/O arrays (a first optical I/O array and a second optical I/O array) similar to the staggered optical I/O arrays A and B in FIG. 1. The first optical I/O array includes optical I/O elements 211-220 and the second optical I/O array includes optical I/O elements 231-240. The first array and the second array are arranged in an interleaving fashion such that an optical I/O element in the first array (e.g., optical I/O element 216) is separated from another optical I/O element in the first array (e.g., optical I/O element 217) by an optical I/O element in the second array (e.g., optical I/O element 236). Similarly, an optical I/O element in the second array (e.g., optical I/O element 233) is separated from another optical I/O element in the second array (e.g., optical I/O element 234) by an optical I/O element in the first array (e.g., optical I/O element 214). In an embodiment, optical I/O elements 211-220 in the first array are optically coupled to optical elements 202, 204 from the first side 252 and optical I/O elements 231-240 are optically coupled to optical elements 206, 208 from the second side 254. The optical elements 202, 204, 206, 208 may all be the same type of optical element or may be different from each other. Examples of optical elements include low loss interconnect waveguides, power splitters, optical amplifiers, optical modulators, filters, lasers, and detectors.

The optical I/O arrays component 250 also includes two feedback loops 260, 262. The feedback loops 260, 262 are optical waveguides. Feedback loop 260 couples optical I/O element 231 to optical I/O element 240 (both I/O elements 231, 240 are in the second array). Feedback loop 262 couples optical I/O element 211 to optical I/O element 220 (both I/O elements 211, 220 are in the first array). The topology of the feedback loops 260, 262 is arranged such that both feedback loops 260, 262 wind back and forth between the top and bottom of the optical I/O arrays component 250 in a manner as shown in FIG. 2 and are thus configured to be below (i.e., nearer the second side 254 of the optical I/O arrays component 250) each optical I/O element 211-220 in the first array and above (i.e., nearer the first side 252 of the optical I/O arrays component 250) each optical I/O element 231-250 in the second array. Thus, all of the optical I/O elements 211-220 in the first array are accessible from the first side of the optical I/O arrays component 250 and all of the I/O elements 231-240 in the second array are accessible from the second side of the optical I/O arrays component 250. In an embodiment, the feedback loops 260, 262 provide optical signal feedback to assist optical fiber array alignment. Providing for on-chip I/O connectivity from both the first and second sides 252, 254 makes connection flexible. In an embodiment, the feedback loops 260, 262 include optical fibers.

Figure 3:
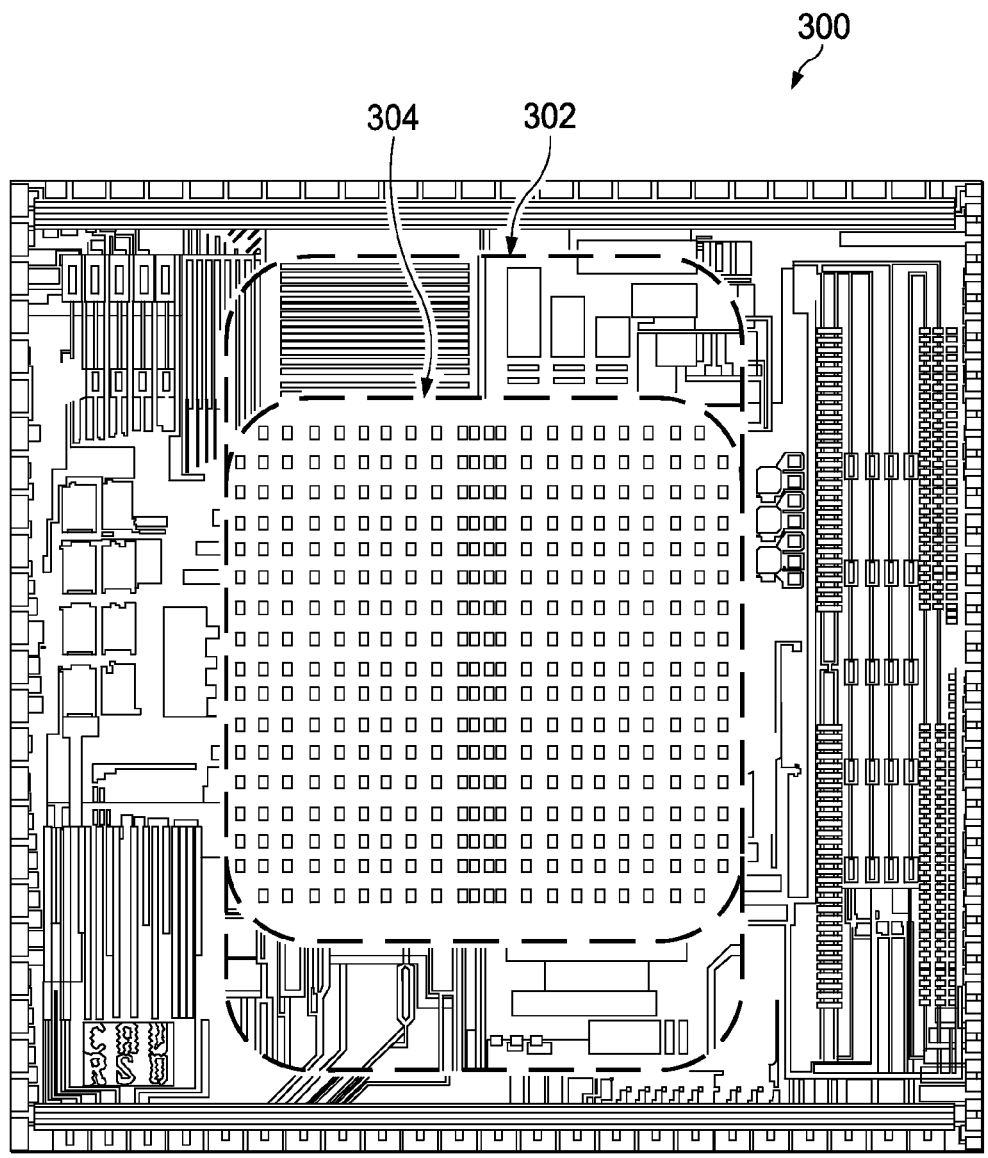
FIG. 3 is a layout view of a PIC the difference in footprint area on the PIC occupied by the optical I/O components when arranged according to the disclosed systems as compared to prior art systems.

FIG. 3 is a layout view of a PIC 300 illustrating the difference in footprint area on the PIC 300 occupied by the optical I/O components when arranged according to the disclosed systems as compared to prior art systems. As can be seen in FIG. 3, the footprint area 302 occupied by the optical I/O elements when arranged according to the prior art is significantly greater than the footprint area 304 occupied by the optical I/O elements when arranged according to the disclosed staggered arrays. For example, for a PIC 300 chip size of 5 millimeters (mm) by 5 mm with 70 grating couplers I/O elements (10 GC per array, with 8 active elements), the array footprint area per array is 100×1270 µm². Thus, the area occupied by the GC arrays is about 35% of the PIC 300 chip (i.e., about 8.89 mm²). However, in an embodiment, the footprint area 304 of arrays of GC elements according to a disclosed system of 4 rows of two 10 element arrays (2 staggered arrays of 10 optical I/O elements each per row=80 grating couplers where each row footprint is about 60×1245 µm²) is about 12% of the PIC 300 chip (i.e., about 2.99 mm²). Thus, significant savings in optical I/O footprint area is achieved by the disclosed systems and methods.

Figure 4:
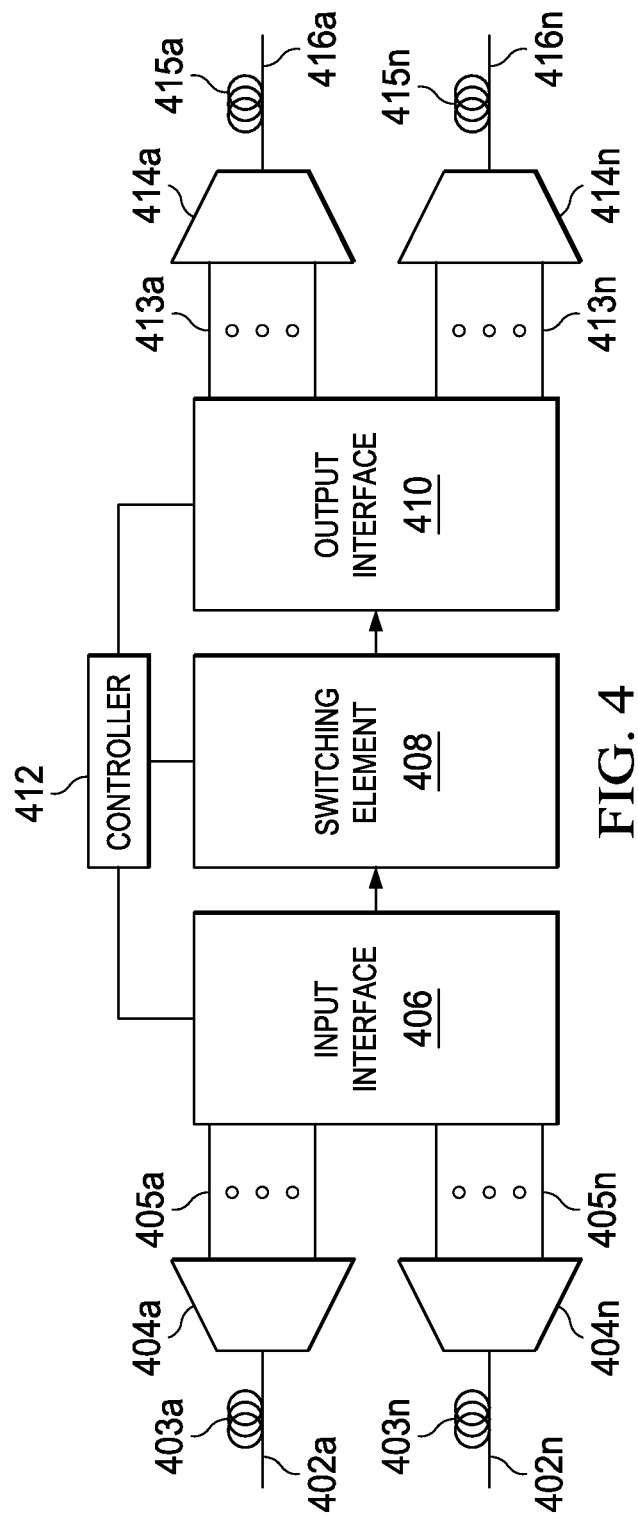
FIG. 4 is a block diagram of an embodiment optical data router.

FIG. 4 is a block diagram of an embodiment optical data router 400. Optical data router 400 is an example of a device or network component that may be used for implementing the apparatuses, systems, and methods disclosed herein. However, it should be noted that the apparatuses, systems, and methods disclosed herein may be implemented in other types of devices other than routers. Specific devices may utilize all of the components shown, or only a subset of the components and levels of integration may vary from device to device. Furthermore, a device may contain multiple instances of a component. Router 400 includes one or more separators 404, an input interface 406, a switching element 408, an output interface 410, a controller 412, and one or more combiners 414. Each separator 404 is configured to separate an input optical signal 403 communicated over a communication link 402. Separator 404 may comprise, for example, a wavelength division demultiplexer. As used throughout this document, the phrases "wavelength division multiplexer" and "wavelength division demultiplexer" may include any optical and/or electrical components—including any hardware, software, and/or firmware—capable of processing wavelength division multiplexed signals and/or dense wavelength division multiplexed signals. In an embodiment, the input interface 406, switching element 408, and/or output interface 410 include a PIC that incorporates the disclosed thermo-optic switches with thermally isolated and heat restricting pillars.

Communication link 402 may include, for example, standard single mode fiber (SMF), dispersion-shifted fiber (DSF), non-zero dispersion-shifted fiber (NZDSF), dispersion compensating fiber (DCF), or another fiber type or combination of fiber types. In some embodiments, communication link 402 is configured to couple router 400 to other optical and/or electro-optical components. For example, link 402 could couple router 400 to a cross-connect or another device operable to terminate, switch, route, process, and/or provide access to and/or from communication link 402 and another communication link or communication device. As used throughout this document, the term "couple" and or "coupled" refers to any direct or indirect communication between two or more elements, whether or not those elements are physically connected to one another. In some embodiments, communication link 402 can comprise a point-to-point communication link or a portion of a larger communication network, such as a ring network, a mesh network, a star network, or other network configuration.

Optical signal 403 may include a multiple wavelength optical signal. For example, optical signal 403 can include at least 5 wavelength channels, at least 100 wavelength channels, or at least 250 wavelength channels. In one particular embodiment, optical signal 403 includes 250 wavelengths having a 50 gigahertz (GHz) spacing within a 100 nanometer (nm) spectral window. In that example, the 100 nm spectral window can be located within the 1400 nm to 1650 nm low-loss window associated with optical fibers. In various embodiments, optical signal 403 can implement one or more data formats, such as, polarization shift keying (PLSK), pulse position modulation (PPM), Multi-Protocol Label Swapping (MPLS), Generalized Multi-Protocol Label Swapping (GMPLS), non-return to zero (NRZ), return to zero (RZ), differential phase shift key (DPSK), or a combination of these or other format types.

In an embodiment, separator 404 is configured or operates to separate optical signal 403 into individual wavelength channels 405 and to couple each wavelength channel 405 to an input interface 406. In an alternative embodiment, separator 404 can separate optical signal 403 into separate multiple-wavelength channels and couple those multiple-wavelength channels to input interface 406. Wavelength channels 405 can comprise, for example, Internet Protocol (IP) packets, voice data, video data, or any other data type and/or data format. In this particular embodiment, each wavelength channel 405 implements a frame format that comprises one or more framing bits, a first packet label that precedes a packet data, and a second packet label that follows the packet data. Surrounding a packet data with packet labels advantageously allows for relatively simple error checking at a destination associated with each wavelength channel 405, however this format is not required. In this example, each wavelength channel 405 implements a Generalized Multi-Protocol Label Swapping (GMPLS) routing protocol within the first and second packet labels. Although this example implements a GMPLS routing protocol, other routing protocols or data formats may be used without departing from the scope of the present disclosure.

In an embodiment, input interface 406 is configured to receive and process each wavelength channel 405 associated with optical signal 403. Input interface 406 can comprise any optical and/or electrical components—including any hardware, software, and/or firmware capable of processing, converting, replicating, updating, and/or swapping one or more packet labels associated with each wavelength channel 405. In various embodiments, input interface 406 can determine a desired routing for a packet data associated with each wavelength channel 405 and can update a first and/or second packet label using an all-optical label swapping technique. The phrase "all-optical" refers to the performance of a desired functionality substantially free from optical-to-electrical or electrical-to-optical conversions. The "all-optical" functionality does not prohibit optical-to-electrical or electrical-to-optical conversions for use by control circuitry that contributes to the overall function of the device. For example, input interface 406 may include a controller that receives an electrical representation of a packet label and generates a control signal that functions to modulate a swapping sequence on an optical signal.

Switching element 408 is configured to process one or more packet data associated with wavelength channels 405 received from input interface 406 and directing those packet data to a desired destination. Switching element 408 can include any optical and/or electrical components—including any hardware, software, and/or firmware—capable of switching, routing, error checking, and/or managing the one or more packet data or packet labels associated with each wavelength channel 405. In an embodiment, the switching element 408 includes one or more processors configured to execute instructions. In an embodiment, one or more of the processors are digital signal processors (DSPs). In an embodiment, the switching element 408 includes memory and/or a storage device that are configured to store data and/or instructions to be executed by the processor. In an embodiment, the switching element 408 includes photonic chips. In an embodiment, switching element 408 can comprise a ring configuration having one or more core router nodes and at least one management node. Although this example implements a ring configuration, switching element 408 could implement a mesh configuration, a star configuration, or any other configuration without departing from the scope of the present disclosure. In various embodiments, switching element 408 can operate to process wavelength channels 405 at processing speeds of, for example, at least 10 gigabits/second (Gb/s), at least 40 Gb/s, at least 100 Gb/s, or at least 160 Gb/s.

In an embodiment, switching element 408 is configured to route one or more packet data associated with wavelength channels 405 to an output interface 410. Output interface 410 can comprise any optical and/or electrical components including any hardware, software, and/or firmware capable of preparing one or more packet data associated with wavelength channels 405 for communication from router 400. In an embodiment, the switching element 408 includes one or more processors. In an embodiment, the processors include digital signal processors (DSPs). In an embodiment, the switching element 408 includes photonic integrated chips. In this example, output interface 410 operates to communicate the one or more packet data from router 400 to a desired destination through an appropriate wavelength channel 413.

In an embodiment, each combiner 414 is configured to combine output wavelength channels 413 into one or more output optical signals 415 for communication over a communication links 416. In an embodiment, combiner 414 includes, for example, a wavelength division multiplexer. The structure and function of communication link 416 can be substantially similar to the structure and function of communication link 402. In this example, communication links 416 operate to couple router 400 to other optical and/or electro-optical components.

In this example, the controller 412 is also capable of at least partially contributing to controlling one or more functionalities associated with router 400. That is, controller 412 is not required to be capable of performing the desired functionality alone, but may contribute to the performance of the function as part of a larger routine. Controller 412 can comprise any communication and/or computational device or devices, including any hardware, software, firmware, or combination thereof.

In an embodiment, in operation, the packet data associated with wavelength channels 405 are transparent to the processing functions of router 400. That is, in operation router 400 does not examine the content of the packet data associated with each wavelength channel 405. In some cases, router 400 does examine the contents of one or more packet labels and/or other elements of a frame format associated with wavelength channels 405. In most cases, router 400 operates to maintain the packet data associated with wavelength channels 405 in the optical domain. That is, the packet data associated with each wavelength channel 405 are not subjected to an optical-to-electrical conversion by router 400. In some cases, one or more of the packet labels and/or other elements of a frame format associated with wavelength channels 405 can be subjected to one or more optical-to-electrical and/or electrical-to-optical conversions. In various embodiments, router 400 may be capable of an aggregate capacity of, for example, at least 5 terabits/second (Tb/s), at least 25 Tb/s, at least 50 Tb/s, or at least 100 Tb/s.

In an embodiment, router 400 can operate to minimize and/or avoid contention between packet data associated with optical signals 403 and 415 and/or wavelength channels 405 and 413 within switching element 408 and/or communication links 402 and 416. The term "contention" as used herein refers to a process by which a packet data competes with other packet data for communication over a specific wavelength. In some cases, contention can be minimized by, for example, implementing a ring network architecture or performing wavelength conversion. Minimizing and/or avoiding contention can result in a reduction in the congestion associated with an optical signal wavelength.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A photonic integrated circuit (PIC) chip, comprising:
   a plurality of first optical input/output (I/O) elements; and
   a plurality of second optical I/O elements,
   wherein a row of I/O elements comprises alternating ones of the first optical I/O elements and the second optical I/O elements,
   wherein the PIC chip is configured such that first optical elements couple to the first optical I/O elements from a first side of the PIC chip and second optical elements couple to the second optical I/O elements from a second side of the PIC chip; and
   a waveguide routing topology that provides signal feedback to facilitate automated active alignment and coupling of an optical fiber array into surface grating coupler (SGC) elements.

2. The PIC chip of claim 1, wherein the first and second optical I/O elements comprise surface grating couplers (SGCs).

3. The PIC chip of claim 2, wherein a distance between successive first and second SGCs comprises half of a pitch for one of the first and second SGCs.

4. The PIC chip of claim 1, wherein a distance between neighboring optical I/O elements is half of a distance of neighboring optical fibers in a fiber array probe.

5. The PIC chip of claim 1, wherein the waveguide routing topology is configured to allow each I/O element to be connected to a corresponding optical element without use of waveguide crossings.

6. The PIC chip of claim 1, wherein the waveguide routing topology is configured such that an optical feedback alignment loop does not intersect with waveguides connecting devices to the I/O elements.

7. A network component configured for transmitting and receiving optical signals, the network component comprising:
   an input interface;

an output interface; and at least one of a controller and a switching element, wherein at least one of the input interface, the output interface, and the at least one of a controller and a switching element comprises a photonic integrated circuit (PIC) chip, wherein the PIC chip comprises:

a plurality of first optical input/output (I/O) elements; and a plurality of second optical I/O elements; and a waveguide routing topology that provides signal feedback to facilitate automated active alignment and coupling of an optical fiber array into surface grating coupler (SGC) elements, wherein a row of I/O elements comprises alternating ones of the first optical I/O elements and the second optical I/O elements, and wherein the PIC chip is configured such that first optical elements couple to the first optical I/O elements from a first side of the PIC chip and second optical elements couple to the second optical I/O elements from a second side of the PIC chip.

8. The network component of claim 7, wherein the first and second optical I/O elements comprise surface grating couplers (SGCs).

9. The network component of claim 8, wherein a distance between successive first and second SGCs comprises half of a pitch for one of the first and second SGCs.

10. The network component of claim 7, wherein a distance between neighboring optical I/O elements is half of a distance of neighboring optical fibers in a fiber array probe.

11. The network component of claim 7, wherein the waveguide routing topology is configured to allow each I/O element to be connected to a corresponding optical element without use of waveguide crossings.

12. The network component of claim 7, wherein the waveguide routing topology is configured such that an optical feedback alignment loop does not intersect with waveguides connecting devices to the I/O elements.

13. A photonic chip, comprising:

a first array of on-chip optical input/output (I/O) elements;

a second array of on-chip optical I/O elements;

a waveguide routing topology that provides signal feedback to facilitate automated active alignment and coupling of an optical fiber array into surface grating coupler (SGC) elements, wherein the first array and second array are interlocking such that an I/O element in the first array is separated from another I/O element in the first array by an I/O element in the second array and such that an I/O element in the second array is separated from another I/O element in the second array by an I/O element in the first array.

14. The photonic chip of claim 13, wherein the photonic chip comprises a silicon photonic chip.

15. The photonic chip of claim 13, wherein the first and second optical I/O elements comprise surface grating couplers (SGCs).

16. The photonic chip of claim 15, wherein a distance between successive first and second SGCs comprises half of a pitch for one of the first and second SGCs.

17. The photonic chip of claim 13, wherein the photonic chip is configured such that first optical elements couple to the first optical I/O elements from a first side of the photonic chip and second optical elements couple to the second optical I/O elements from a second side of the photonic chip.

18. The photonic chip of claim 13, wherein a distance between neighboring optical I/O elements is half of a distance of neighboring optical fibers in a fiber array probe.

19. The photonic chip of claim 13, further comprising a waveguide routing topology that provides signal feedback to facilitate automated active alignment and coupling of an optical fiber array into surface grating coupler (SGC) elements.

20. The photonic chip of claim 19, wherein the waveguide routing topology is configured to allow each I/O element to be connected to a corresponding optical element without use of waveguide crossings.

21. The photonic chip of claim 19, wherein the waveguide routing topology is configured such that an optical feedback alignment loop does not intersect with waveguides connecting devices to the I/O elements.

* * * * *